United States Patent
Ranjbar et al.

(10) Patent No.: US 11,316,739 B2
(45) Date of Patent: Apr. 26, 2022

(54) METHODS, CONTROLLER MANAGER AND CONTROLLER AGENT FOR ENABLING A CONNECTION BETWEEN A SWITCH OF A COMMUNICATION NETWORK AND A SWITCH CONTROLLER

(71) Applicant: Telefonaktiebolaget LM Ericsson (publ), Stockholm (SE)

(72) Inventors: Alireza Ranjbar, Espoo (FI); Nicklas Beijar, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/759,446

(22) PCT Filed: Oct. 8, 2018

(86) PCT No.: PCT/EP2018/077279
§ 371 (c)(1),
(2) Date: Apr. 27, 2020

(87) PCT Pub. No.: WO2019/081188
PCT Pub. Date: May 2, 2019

(65) Prior Publication Data
US 2020/0295998 A1     Sep. 17, 2020

Related U.S. Application Data (60) Provisional application No. 62/577,731, filed on Oct. 27, 2017.

(51) Int. Cl.
*G06F 15/173* (2006.01)
*H04L 41/0893* (2022.01)
(Continued)

(52) U.S. Cl.
CPC ........ *H04L 41/0893* (2013.01); *H04L 41/046* (2013.01); *H04L 41/0816* (2013.01);
(Continued)

(58) Field of Classification Search
CPC ............... H04L 41/0893; H04L 41/046; H04L 41/0816; H04L 43/0811; H04L 43/10; H04L 61/2015
See application file for complete search history.

(56) References Cited

U.S. PATENT DOCUMENTS 10,397,124 B2 *  8/2019  Atli ........................ H04L 47/11
2015/0163152 A1 *  6/2015  Li ........................ H04L 41/5019
                                                  370/409
(Continued)

OTHER PUBLICATIONS

International Search Report and Written Opinion of the International Searching Authority, PCT/EP2018/077279, dated Nov. 28, 2018, 10 pages.
(Continued)

*Primary Examiner* — Richard G Keehn
(74) *Attorney, Agent, or Firm* — Sage Patent Group (57) ABSTRACT

A controller manager, a controller agent and methods therein, for enabling a connection between a switch of a communication network and a switch controller that performs logic switch operations. The controller manager obtains from the controller agent, measurements related to connectivity to a set of switch controllers. The controller manager then selects at least one switch controller in the set of switch controllers based on the obtained measurements, to control said switch, and instructs the controller agent to set up or route a connection between the switch and the selected at least one switch controller.

21 Claims, 5 Drawing Sheets

(51) Int. Cl.
*H04L 41/046* (2022.01)
*H04L 41/0816* (2022.01)
*H04L 43/0811* (2022.01)
*H04L 43/10* (2022.01)
*H04L 61/5014* (2022.01)
*H04L 43/08* (2022.01)
*H04L 41/0896* (2022.01)

(52) U.S. Cl.
CPC .......... *H04L 41/0896* (2013.01); *H04L 43/08* (2013.01); *H04L 43/0811* (2013.01); *H04L 43/10* (2013.01); *H04L 61/2015* (2013.01)

(56) References Cited

U.S. PATENT DOCUMENTS

| | | | | |
|---|---|---|---|---|
| 2016/0330076 | A1* | 11/2016 | Tiwari | H04L 41/0806 |
| 2016/0337245 | A1* | 11/2016 | Yamada | H04L 41/0813 |
| 2018/0205656 | A1* | 7/2018 | Atli | H04L 47/11 |
| 2020/0084128 | A1* | 3/2020 | Schneider | H04L 43/0811 |

OTHER PUBLICATIONS

Shah, S. A. R., et al., "An Adaptive Load Monitoring Solution For Logically Centralized SDN Controller," 2016 18$^{th}$ Asia-Pacific Network Operations and Management Symposium (APNOMS), IEICE, Oct. 5, 2016 (XP032998103) 6 pages.

Phemius, K., "DISCO: Distributed Multi-Domain SDN Controllers," <URL: http://arxiv.org/pdf/1308.6138v1.pdf> Aug. 28, 2013 (XP055276095) 8 pages.

* cited by examiner

METHODS, CONTROLLER MANAGER AND CONTROLLER AGENT FOR ENABLING A CONNECTION BETWEEN A SWITCH OF A COMMUNICATION NETWORK AND A SWITCH CONTROLLER

CROSS REFERENCE TO RELATED APPLICATIONS

This application is a 35 U.S.C. § 371 national stage application of PCT International Application No. PCT/EP2018/077279 filed on Oct. 8, 2018, which in turns claims domestic priority to U.S. Provisional Patent Application No. 62/577,731, filed on Oct. 27, 2017, the disclosures and content of which are incorporated by reference herein in their entirety.

TECHNICAL FIELD

The present disclosure relates generally to a controller manager, a controller agent and methods therein, for enabling a connection between a switch of a communication network and a switch controller that performs logic switch operations.

BACKGROUND

Recently, so-called Software Defined Networks, SDN, have been proposed to enable communication of data. An SDN contains various nodes and switches for data transport, which nodes are commonly referred to as "network devices" in this field. The switches in an SDN are thus used for handling and communicating data traffic, also referred to as data or traffic flows, in the network. The network devices of an SDN may include various switches, routers and firewalls which operate according to software or data programs which thus control their operation. This description is mainly concerned with the control of switches, including basically any nodes in the network where switching of data traffic take place.

In terms of protocol layers, an SDN basically separates a control layer from a forwarding layer and provides an abstract topology of network resources to a logically centralized controller which may be employed to control the operation of switches in the SDN. In this description, such a controller is referred to as a "switch controller", although any of the terms "controller" and "SDN controller" could also be used to denote a switch controller. Switch controllers may be implemented as processing resources or the like in remote data centers to serve and control operation of various switches in a communication network such as an SDN. Switch controllers communicate with switches using a protocol, such as Open Flow, which consequently connects the control layer to the forwarding layer. It can be said that network devices capable of using Open Flow are "OpenFlow-enabled".

To implement SDN in large networks, the SDN controllers, such as an Open Network Operating System ONOS, are often deployed in several machines in a distributed manner. This may be useful to achieve improved fault-tolerance and enables the deployment of SDN in large distributed networks. For example, a distributed ONOS controller may be deployed to handle the network devices in a large Wide Area Network, WAN.

In OpenFlow-enabled network devices, a switch can be configured to connect to several controller nodes such as switch controllers. To do so, the switch needs to be configured with a list of the controllers' IP addresses. When a switch connects to multiple switch controllers, one controller will become a master controller while other controllers will remain in slave mode. The process of appointing a master controller may be executed between switch controllers, but it is also possible to set Master controller using Representational State Transfer, REST, Application Program Interfaces, APIs, provided by the controllers.

However, when remote switch controllers are used to control operation of switches in a communication network such as an SDN, it may be a problem that a switch controller that has been selected and allocated to control a certain switch is not able to communicate with the switch in an efficient manner.

SUMMARY

It is an object of embodiments described herein to address at least some of the problems and issues outlined above. It is possible to achieve this object and others by using a controller manager, a controller agent and methods therein, as defined in the attached independent claims.

According to one aspect, a method is performed by a controller manager for enabling a switch of a communication network to be controlled by a switch controller that performs logic switch operations. In this method, the controller manager obtains, from a controller agent, measurements related to connectivity to a set of switch controllers. The controller manager then selects at least one switch controller in the set of switch controllers based on the obtained measurements, to control said switch, and instructs the controller agent to set up or route a connection between the switch and the selected at least one switch controller.

According to another aspect, a controller manager is arranged to enable a switch of a communication network to be controlled by a switch controller that performs logic switch operations. The controller manager is configured to obtain from a controller agent, measurements related to connectivity to a set of switch controllers. The controller manager is further configured to select at least one switch controller in the set of switch controllers based on the obtained measurements, to control said switch, and to instruct the controller agent to set up or route a connection between the switch and the selected at least one switch controller.

According to another aspect, a method is performed by a controller agent for enabling a switch of a communication network to be controlled by a switch controller that performs logic switch operations. In this method, the controller agent performs measurements related to connectivity to a set of switch controllers, and reports said measurements related to connectivity to a controller manager. The controller agent further receives from the controller manager an instruction to set up or route a connection between the switch and at least one switch controller which has or have been selected based on the reported measurements related to connectivity. The controller agent then sets up or routes a connection between the switch and the at least one switch controller according to the received instruction.

According to another aspect, a controller agent is arranged to enable a switch of a communication network to be controlled by a switch controller that performs logic switch operations. The controller agent is configured to perform measurements related to connectivity to a set of switch controllers, and to report said measurements related to connectivity to a controller manager. The controller agent is also configured to receive from the controller manager an instruction to set up or route a connection between the switch and at least one switch controller which has or have been selected based on the reported measurements related to connectivity. The controller agent is further configured to set up or route a connection between the switch and the at least one switch controller according to the received instruction.

The above controller manager, controller agent and methods therein may be configured and implemented according to different optional embodiments to accomplish further features and benefits, to be described below.

A computer program is also provided comprising instructions which, when executed on at least one processor in either of the above first agent, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

The embodiments and examples described herein may be used in a procedure for enabling a switch of a communication network to be controlled by a switch controller that performs logic switch operations. In this solution, it has been recognized that a switch controller should be selected for a specific switch so that adequate low network and processing latency, i.e. delays, and/or enough throughput can be achieved when the switch controller communicates with the switch.

First, some problems and issues that may occur in conventional solutions will be identified and discussed. Even though the following discussion refers to SDN as an illustrative example, it may also be valid for any other types of networks and applications, and the embodiments and examples herein are not limited to SDN.

The introduction of SDN enables flexibility in configuring switches, as the switch logic is moved to a centralized controller, i.e. the above-mentioned switch controller. This allows a wide range of features that can be implemented. Many custom hardware elements, such as Network Address Translations, NATs, and firewalls, can also be replaced with SDN switches and related applications in the switch controller. On the other hand, the complexity of configuring and managing the controller nodes has increased. As a consequence, many companies, operators and users do not have the knowledge required to operate their network and set up and configure a SDN or switch controller.

To provide reliable operation, several switch controllers may be needed to achieve redundancy. As a switch controller may handle the complex logic of several network elements such as switches, the load on the controller is high and several switch controllers are often needed for load balancing reasons. As the size of the network increases, the number of switch controllers that serve the network may need to be dynamically increased. Companies may for example need to dimension their switch controllers according to the peak requirement in terms of scalability, redundancy, and future growth. On the other hand, it may be desirable to avoid too much redundancy because of cost reasons.

For the above issues related to costs, knowledge and management efforts, it may often be a more feasible solution that a company buys the switch controller as an external service, e.g. from a remote data center. The controller could then be maintained by a third party, which through an easy-to-use interface allows configuring the network for a particular customer.

Even if the switch controller is operated by a third party, at least some of the problems below may need to be addressed:

The switches may need to be manually configured with the addresses of the switch controllers, which implies a high operational cost. Switches typically do not support a Domain Name System, DNS, based resolution, but need to be configured with a fixed IP address.

The load may need to be balanced between several switch controllers automatically, since that would require switches to be reconfigured with new switch controllers.

The switch controller providers cannot add new servers (running controller nodes) and remove an existing server in order to scale and distribute the capacity between the controller nodes. Since any changes in connectivity to servers needs to be reflected to all switches in the network. In this context, a server may thus run one or more switch controllers.

In SDN, the latency between switches and switch controllers may be important to achieve good performance and capacity. Distance is often an important factor for latency, especially in reactive SDN operation, since the first packets of each session is sent to the switch controller and the session establishment is basically delayed depending on the distance between the switch and the switch controller. Distance is also important in order to reduce network traffic such that a short distance results in low traffic, and vice versa. In case of multi-controller SDN, the latency becomes even more important as controllers nodes are replicated in different locations and it may be desirable to connect the closest ones to each communication network.

If a switch controller fails, the affected switches must immediately be reconnected to a replacing switch controller.

For security reasons, the switch controller should not accept traffic from any source since this would make the controller vulnerable to so-called Denial of Service, DoS, attacks. It should only accept traffic from switches with which there is a service agreement.

Figure 1:
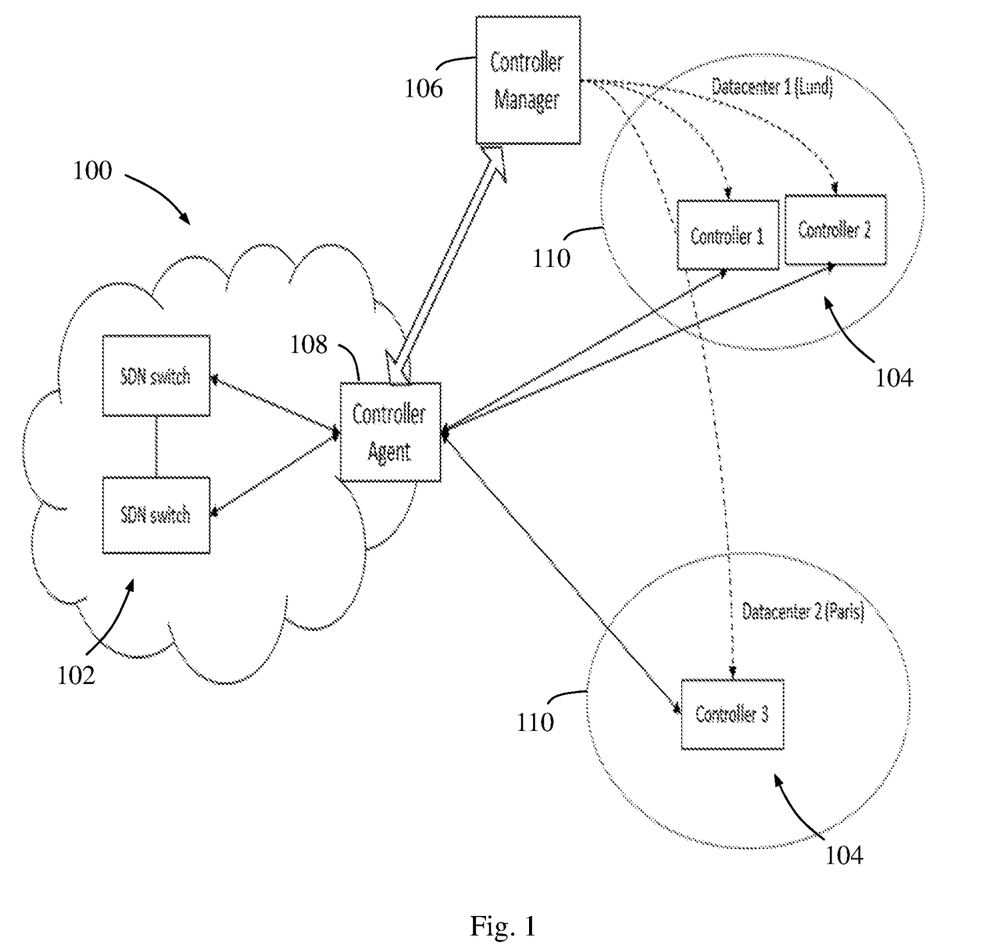
FIG. 1 is a communication scenario illustrating how a controller manager and a controller agent may be employed to handle connection of switch controllers in data centers with switches in an SDN, according to some possible embodiments.

A communication scenario where the solution can be employed is illustrated in FIG. 1 where a communication network 100 comprises a number of switches 102, in this example illustrated as SDN switches, and where a selection of switch controllers 104 are able to serve and control the switches 102 by performing logic switching operations remotely. In this solution, a controller manager 106 is employed which basically selects and allocates appropriate switch controllers to serve the switches 102 by means of a controller agent 108, e.g. in a signaling procedure illustrated in FIG. 2 and as follows.

Figure 2:
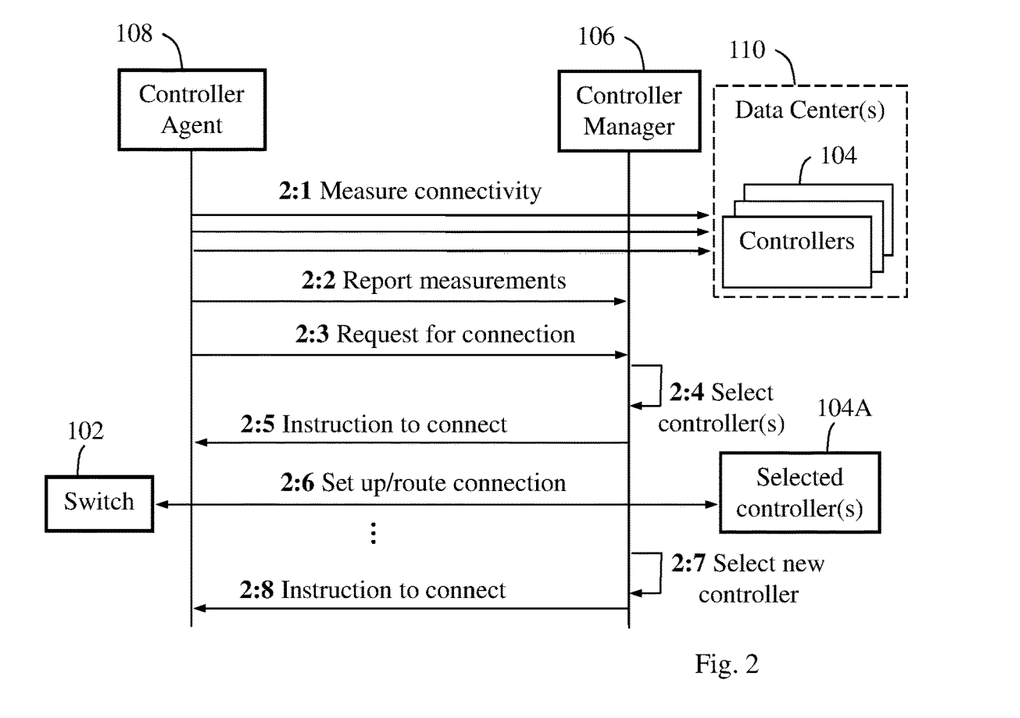
FIG. 2 is a signaling diagram illustrating an example of a procedure when the solution is used, according to further possible embodiments.

Using the same reference numbers as in FIG. 1, the signaling procedure of FIG. 2 involves a switch 102, a set of (remote) switch controllers 104 located in one or more datacenters 110, one or more selected switch controllers 104A, a central controller manager 106 and a local controller agent 108.

Throughout this description, the controller agent 108 may be referred to as a "local" controller agent implying that it serves switches located relatively close to the controller agent, e.g. by being in the same network 100 as the agent 108. On the other hand, the controller manager 106 may be centralized in the sense that it can serve any local controller agents in different networks. The switch controllers 104 may be located anywhere, e.g. in data centers remote from the switches 102 such as one datacenter in Lund (Sweden) and another datacenter in Paris (France), as shown in FIG. 1.

Figure 3:
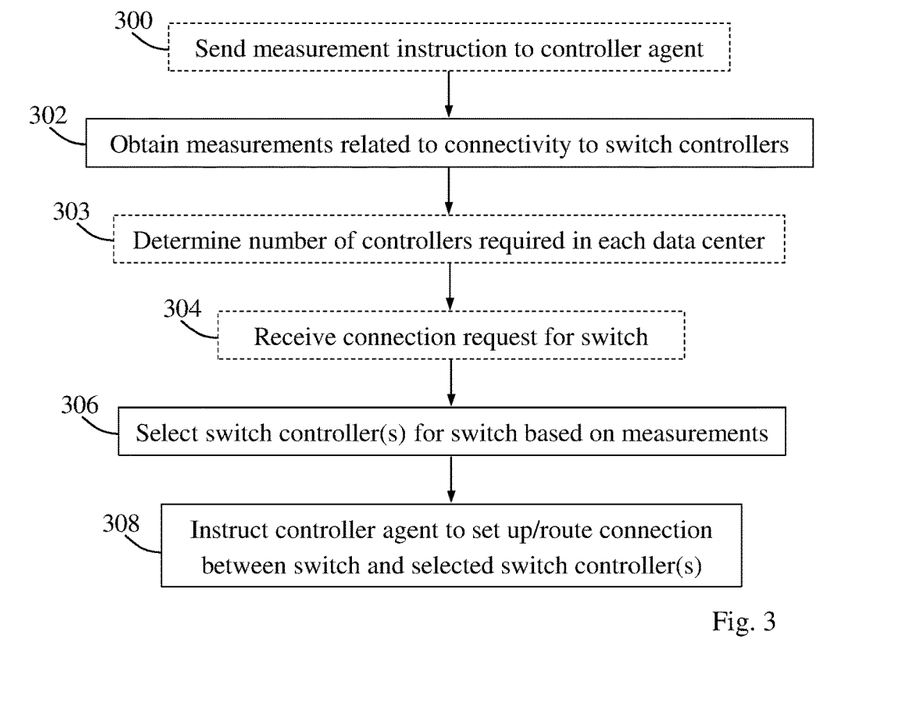
FIG. 3 is a flow chart illustrating a procedure in a controller manager, according to further possible embodiments.

An example of how the solution may be employed in terms of actions performed by a controller manager such as the controller manager 106, is illustrated by the flow chart in FIG. 3 which will now be described with further reference to the signaling procedure in FIG. 2. FIG. 3 thus illustrates a procedure with actions performed in the controller manager 106, for enabling a switch 102 of a communication network to be controlled by a switch controller that performs logic switch operations. Some optional example embodiments that could be used in this procedure will also be described.

A first optional action 300 illustrates that the controller manager 106 may instruct a controller agent 108 to perform measurements related to connectivity to a set of switch controllers 104. These measurements are illustrated by an action 2:1 in FIG. 2.

An action 302 then illustrates that the controller manager 106 obtains from a controller agent 108, measurements related to connectivity to a set of switch controllers 104, as also shown in action 2:2 of FIG. 2 where the controller agent 108 reports the measurements of action 2:1 to the controller manager 106. The controller manager 106 may further determine how many switch controllers are required in each data center and then create/remove switch controllers accordingly, as indicated by another optional action 303.

The controller manager 106 may further receive a connection request for the switch 102 from the controller agent 108, as shown in an optional action 304 and also in action 2:3 of FIG. 2.

In another action 306, the controller manager 106 selects at least one switch controller 104A in the set of switch controllers 104 based on the obtained measurements, to control said switch 102, as also shown in action 2:4 of FIG. 2. This action 306 or 2:4 may be performed in response to the connection request of action 304 or 2:3, respectively. In this context, it should be noted that selecting a switch controller to control said switch 102 is equivalent to allocating a switch controller to control the switch.

In a final action 308, the controller manager 106 instructs the controller agent 108 to set up or route a connection between the switch and the selected at least one switch controller, as also shown in action 2:5 of FIG. 2.

Figure 4:
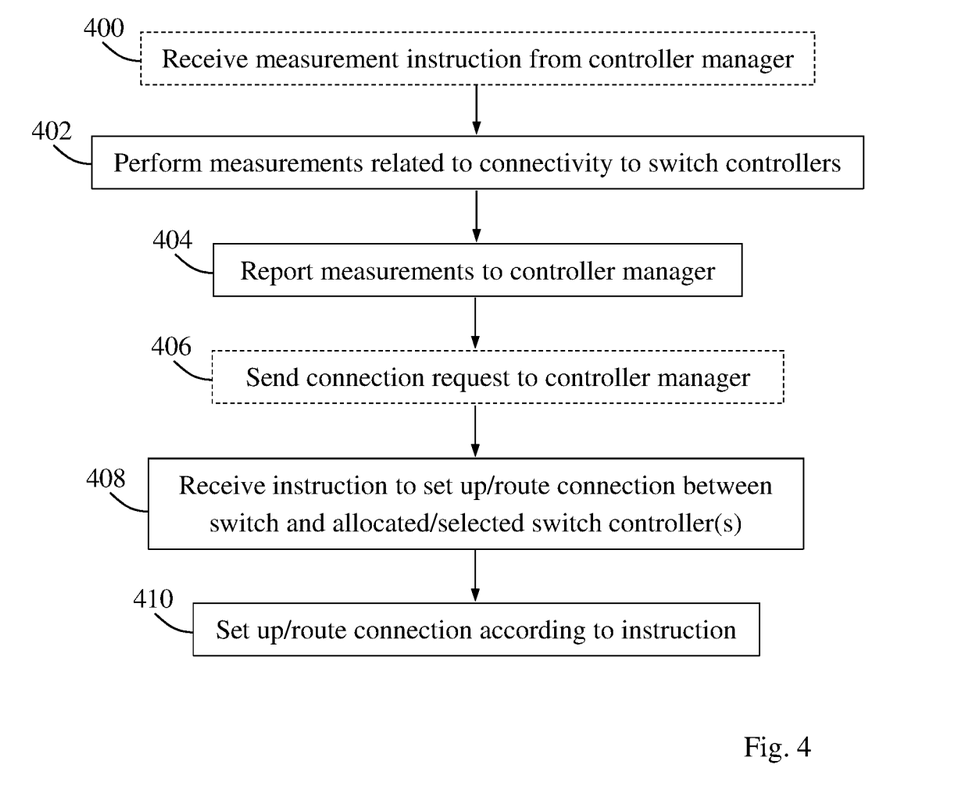
FIG. 4 is a flow chart illustrating a procedure in a controller agent, according to further possible embodiments.

Another example of how the solution may be employed in terms of actions performed by a controller agent such as the controller agent 108, is further illustrated by the flow chart in FIG. 4 which will now be described likewise with further reference to FIG. 2. The controller agent 108 may perform the actions in FIG. 4 in conjunction with the actions in FIG. 3 performed by the controller manager 106, as indicated below. FIG. 4 thus illustrates a procedure in the controller agent 108 for enabling a switch 102 of a communication network 100 to be controlled by a switch controller 104A that performs logic switch operations. Some optional example embodiments that could be used in this procedure will also be described.

A first optional action 400 illustrates that the controller agent 108 may receive a measurement instruction from the controller manager 106, which corresponds to action 300. An action 402 illustrates that the controller agent 108 performs measurements related to connectivity to a set of switch controllers 104, as also shown in action 2:1 of FIG. 2.

In another action 404, the controller agent 108 reports said measurements related to connectivity to a controller manager 106, as also shown in action 2:2 of FIG. 2 which also corresponds to action 302.

A further optional action 406 illustrates that if the controller agent 108 detects a connection from a switch 102, it may send a connection request for the switch 102 to the controller manager 106, as also shown in action 2:3 of FIG. 2 which also corresponds to action 304.

In another action 408, the controller agent 108 receives from the controller manager 106 an instruction to set up or route a connection between the switch 102 and at least one switch controller 104A which has or have been selected based on the reported measurements related to connectivity, as also shown in action 2:5 of FIG. 2. Action 408 corresponds to action 308.

In a final action 410, the controller agent 108 sets up or routes a connection between the switch 102 and the at least one switch controller 104A according to the instruction received in action 408, as also shown in action 2:6 of FIG. 2.

The controller manager 106 may further select a new switch controller in the set of switch controllers to serve the switch, as also shown in action 2:7 of FIG. 2. This operation may be performed for at least one of the following reasons: 1) in case the previous switch controller becomes inactive or relocated, or 2) when the set of switch controllers need to be load balanced, or 3) when the new switch controller is instantiated/introduced. A final action 2:8 of FIG. 2 illustrates that the controller manager 106 sends another instruction to the controller agent 108, to set up or route a connection between the switch 102 and the new switch controller selected in action 2:7.

The proposed solution allows the connections from switches to controllers be managed by an external partner. In this solution, the controller manager 106 may instruct local controller agents to perform the above-described connectivity measurements and connect the switches to appropriate switch controllers. The controller agent 108 basically intercepts the connections from the switches and directs them to the correct switch controller 104A selected in action 306 or 2:4, e.g. based on rules than may have been configured. The controller agent 108 is able to perform or collect measurements on the link between the switch controllers and the switches. This information is sent to the controller manager 106 as a basis to make efficient decisions. The controller manager 106 may further control the creation/removal of controller instances 104 and may also apply access rules for admitting traffic to the switch controllers.

The solution may be useful to solve or reduce at least some of the problems described above. One or more of the following advantages may thus be achieved:

- The switch does not need to be manually configured.
- The control workload from switches can be balanced between several switch controllers.
- Switch controllers can be dynamically added and removed to allow optimizing the use of resources.
- Switches can be connected to their closest switch controllers. Therefore, the latency in switch-controller connectivity can be minimized in multi-instance controllers.
- With this solution, third-party providers can manage the connectivity from local switches to remote switch controllers without having direct access to the communication network which may be a local network that may have access restrictions.
- Switches can be reconfigured with a replacing switch controller if the currently used switch controller fails.
- It is possible to employ an access control mechanism for accessing the switch controller nodes. As a result, the access to remote switch controllers can be limited to authorized switches.

Additionally, the solution may have the following further advantages:

- No changes are required to the switch controllers 104.
- No changes are required to the switches 102.
- The embodiments herein may add minimal delay in switch-controller connections.
- The management cost of the network 100 can be reduced.
- It allows a new type of business for providing switch controllers as a service.
- The solution is transparent to the type of controller protocol and the transport used (e.g. the used security).

Some optional embodiments that may be employed by the controller manager 106 in the procedure of FIG. 3, will now be described and with further reference to FIG. 2. In one example embodiment, the controller manager 106 may obtain said measurements related to connectivity by instructing the controller agent 108, as shown in action 300, to perform the measurements. In further example embodiments, the obtained measurements may be related to at least one of: network latency, processing latency and throughput, and the controller manager 106 may in that case select the at least one switch controller with lowest latency and/or highest throughput.

In another example embodiment, the obtained measurements may indicate connectivity to the switch controllers 104 themselves or to one or more data centers 110 where the switch controllers 104 are located.

In another example embodiment, the controller manager 106 may in action 306 select the at least one switch controller in response to receiving a connection request for the switch from the controller agent, as in action 304 or 2:5.

In another example embodiment, the controller manager 106 may control connection to the set of switch controllers 104 by sending connectivity rules to the controller agent 108, said connectivity rules determining which switches should be connected to the respective switch controllers.

In another example embodiment, the controller manager may instruct the controller agent 108 in action 308 or 2:5 to set up or route a connection between the switch 102 and the selected at least one switch controller 104A, by sending an IP mapping of each switch controller to the controller agent 108. In that case, another example embodiment may be that said IP mapping indicates an IP address of the respective switch controller.

In further example embodiments, the controller manager may, as in action 2:7 above, select a new switch controller in the set of switch controllers to serve the switch, 1) in case the previous switch controller becomes inactive or relocated, or 2) when the set of switch controllers need to be load balanced, or 3) when the new switch controller is instantiated/introduced. In another example embodiment, the communication network 100 may be a Software Defined Network, SDN.

Some optional embodiments that may be employed by the controller agent 108 in the procedure of FIG. 4, will now be described again with further reference to FIG. 2.

In some example embodiments, the controller agent 108 may perform the measurements related to connectivity in action 402 by measuring at least one of: a round trip delay between each switch controller 104 and the controller agent 108, a delay between a request and a following response from the respective switch controller 104, and the amount of traffic sent to/from the respective switch controllers 104.

In another example embodiment, the measurements performed in action 402 may indicate connectivity to the switch controllers 104 themselves or to one or more data centers 110 where the switch controllers 104 are located. In another example embodiment, said measurements of connectivity may be performed in action 402 in response to receiving a measurement instruction from the controller manager 106, as of action 400.

In another example embodiment, the controller agent 108 may receive connectivity rules from the controller manager 106, said rules determining which switches should be connected to the respective switch controllers.

In another example embodiment, the controller agent 108 may send a connection request for the switch 102 to the controller manager, as of action 406 or 2:3.

In another example embodiment, the instruction to set up or route a connection between the switch 102 and the at least one switch controller 104A, as received in action 408, may include an IP mapping of each switch controller 104. In that case, another example embodiment may be that said IP mapping indicates an IP address of the respective switch controller.

In another example embodiment, the communication network 100 may be a Software Defined Network, SDN.

In another example embodiment, the controller agent 108 may integrate or control a Network Address Translator, NAT, which translates the destination IP address in control traffic sent by the switch into an IP address of the respective switch controller. In an alternative embodiment, the controller agent 108 may integrate or control a Dynamic Host Configuration Protocol, DHCP, server (not shown) that configures the switch 102 with the IP address of the respective switch controller 104, 104A.

In another alternative embodiment, the controller agent 108 may integrate or control a software defined network switch which the controller agent configures to translate the destination IP address in control traffic sent by the switch 102 into the IP address of the respective switch controller 104, 104A.

Figure 5:
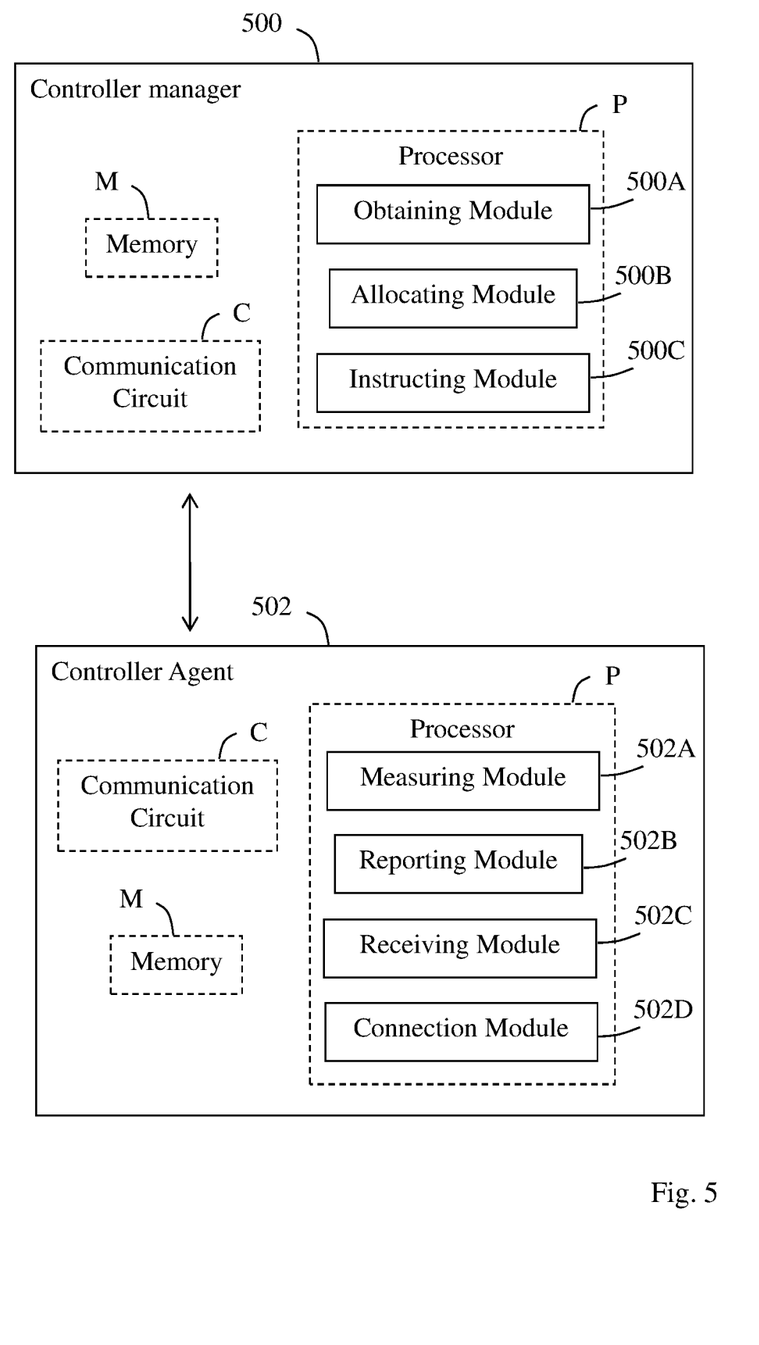
FIG. 5 is a block diagram illustrating a controller manager and a controller agent in more detail, according to further possible embodiments.

The block diagram in FIG. 5 illustrates a detailed but non-limiting example of how a controller manager 500 and a controller agent 502, respectively, may be structured to bring about the above-described solution and embodiments thereof. In this figure, the controller manager 500 and the controller agent 502 may be configured to operate according to any of the examples and embodiments of employing the solution as described herein, where appropriate. Each of the controller manager 500 and the controller agent 502 is shown to comprise a processor "P", a memory "M" and a communication circuit "C" with suitable equipment for transmitting and receiving radio signals in the manner described herein.

The communication circuit C in each of the controller manager 500 and the controller agent 502 thus comprises equipment configured for communication with each other, and also with switch controllers and switches, respectively, using suitable protocols for the communication depending on the implementation. The solution is however not limited to any specific types of messages or protocols.

The controller manager 500 is, e.g. by means of units, modules or the like, configured or arranged to perform at least some of the actions of the flow chart in FIG. 3 and as follows. Further, the controller agent 502 is, e.g. by means of units, modules or the like, configured or arranged to perform at least some of the actions of the flow chart in FIG. 4 and as follows.

The controller manager 500 is arranged to enable a switch of a communication network to be controlled by a switch controller that performs logic switch operations. The controller manager 500 is configured to obtain from a controller agent 502, measurements related to connectivity to a set of switch controllers. This operation may be performed by an obtaining module 500A in the controller manager 500, as illustrated in action 302.

The controller manager 500 is also configured to select at least one switch controller in the set of switch controllers based on the obtained measurements, to control said switch. This operation may be performed by an allocating module 500B in the controller manager 500, as illustrated in action 306. The allocating module 500B could alternatively be named a selecting module or a logic module.

The controller manager 500 is further configured to instruct the controller agent 502 to set up or route a connection between the switch and the allocated/selected at least one switch controller. This operation may be performed by an instructing module 500C in the controller manager 500 as illustrated in action 308. The instructing module 500C could alternatively be named a sending module.

The controller agent 502 is arranged to enable a switch of a communication network to be controlled by a switch controller that performs logic switch operations. The controller agent 502 is configured to perform measurements related to connectivity to a set of switch controllers. This operation may be performed by a measuring module 502A in the controller agent 502 as illustrated in action 402.

The controller agent 502 is also configured to report said measurements related to connectivity to a controller manager 500. This operation may be performed by a reporting module 502B in the controller agent 502, as illustrated in action 404.

The reporting module 502B could alternatively be named a sending module or unit.

The controller agent 502 is further configured to receive from the controller manager 500 an instruction to set up or route a connection between the switch and at least one switch controller which has or have been allocated/selected based on the reported measurements related to connectivity. This operation may be performed by a receiving module 502C in the controller agent 502, as illustrated in action 408.

The controller agent 502 is further configured to set up or route a connection between the switch and the at least one switch controller according to the received instruction. This operation may be performed by a connection module 502D in the controller agent 502, as illustrated in action 410. The connection module 502D could alternatively be named a routing module or unit.

It should be noted that FIG. 5 illustrates various functional modules in the controller manager 500 and the controller agent 502, respectively, and the skilled person is able to implement these functional modules in practice using suitable software and hardware equipment. Thus, the solution is generally not limited to the shown structures of the controller manager 500 and the controller agent 502, and the functional modules therein may be configured to operate according to any of the features, examples and embodiments described in this disclosure, where appropriate.

The functional modules 500A-C and 502A-D described above may be implemented in the controller manager 500 and the controller agent 502, respectively, by means of program modules of a respective computer program comprising code means which, when run by the processor P causes the controller manager 500 and the controller agent 502 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the controller manager 500 and the controller agent 502 in the form of a memory having a computer readable medium and being connected to the processor P. The computer program product or memory M in each of the controller manager 500 and the controller agent 502 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective controller manager 500 and controller agent 502.

The solution described herein may be implemented in each of the controller manager 500 and the controller agent 502 by a computer program comprising instructions which, when executed on at least one processor, cause the at least one processor to carry out the actions according to any of the above embodiments and examples, where appropriate. The solution may also be implemented at each of the controller manager 500 and the controller agent 502 in a carrier containing the above computer program, wherein the carrier is one of an electronic signal, optical signal, radio signal, or computer readable storage medium.

Some further examples and characteristics of how the solution may be used and implemented in practice will now be described.

As depicted in FIG. 1, the solution may involve the following entities, using SDN terminology as an example:

SDN Switches (or Switches): The SDN Switches are unmodified switches communicating with a switch controller using e.g. OpenFlow.

SDN Controllers (or simply Controllers): The SDN Controllers control the routing in SDN switches using a controller protocol, such as OpenFlow. The existing SDN controllers usually provide a set of APIs which can be used by the controller manager. The SDN Controllers do not require modification for the solution.

Controller Agent (or Agent): The Controller Agent controls the traffic between SDN switches and SDN controllers e.g. based on rules received from the Controller Manager. The agent can actively measure round-trip delay to each SDN controller node. The agent can also passively measure the latency between request/responses exchanged between switches and switch controllers.

Controller Manager (or Manager): The Controller Manager allocates suitable switch controllers for switches based on the above-described connectivity measurements. The Controller Manager may also create rules for the connectivity between SDN switches and SDN Controllers and installs the rules to the Controller Agents.

Some further examples of implementation will now be described with respect to detection of distance to switch controllers and selection/allocation of a switch controller.

Distance Detection

Distance detection may be a useful feature for determining or estimating the latency to the available switch controllers (e.g. running on remote data centers). The Controller Agent primarily needs to determine the latency between itself and a node (e.g. a switch controller) in each data center and then send this information to the Controller Manager. The Controller Agent may use two alternative methods for detecting the latency as follows.

1. Passive measurements: The Controller Agent can decode the traffic between the switch and the switch controller using an installed security key or certificate. From the observed traffic, the Controller Agent studies the time between a request (e.g. ARP request or incoming packet) to the switch controller and the corresponding response (e.g. ARP reply or rule configuration based on the incoming packet) from the switch controller.

2. Active measurements: The Controller Agent can send an Internet Control Message Protocol, ICMP, ping request to the switch controller or another machine in the same data center as the switch controller, and can then calculate the network latency based on the received ICMP ping reply.

Since passive measurements indicate the real processing delay in switch controllers, it may be preferred to use passive measurements instead of active measurements (involving ping requests/replies). However, if the passive measurement is unavailable, e.g. because of the type of encryption, the Controller Agent may revert to the active measurement method.

The Controller Agent receives from the Controller Manager a list of destinations to which it should test the latency. The Controller Agent, after performing the measurements, sends the measurement results to the Controller Manager, which uses the results in selecting the nearest switch controller.

Controller Selection

The Controller Manager may maintain a database of the latencies between controller agents and data centers. To update the database, the Controller Manager may, for example periodically, request Controller Agents to perform latency measurements as described above.

The Controller Manager may be responsible to set IP mappings in the controller agent. The controller manager can reactively set new IP mappings for new connections from the switch. In this approach, after receiving new connections from the switch, the controller agent will request the controller manager for new IP addresses. In addition, the controller manager can provide the Controller Agent with a pool of available switch controllers and the number of switches that can be connected to each of the switch controllers. The Controller Agent may thus have pre-calculated information about where to connect new switches. The Controller Agent could indicate to the Controller Manager once a switch has been connected to a switch controller. The Controller Manager can then update the pool of available switch controllers when it is close to depletion.

The Controller Manager can create new Controller instances on demand if there are more requests for a switch controller than there are running instances available in the particular data center. The Controller Manager may also decide to reduce the number of Controller instances, which may require relocating some switches to another switch controller from the Controller instance to be removed.

Figure 6:
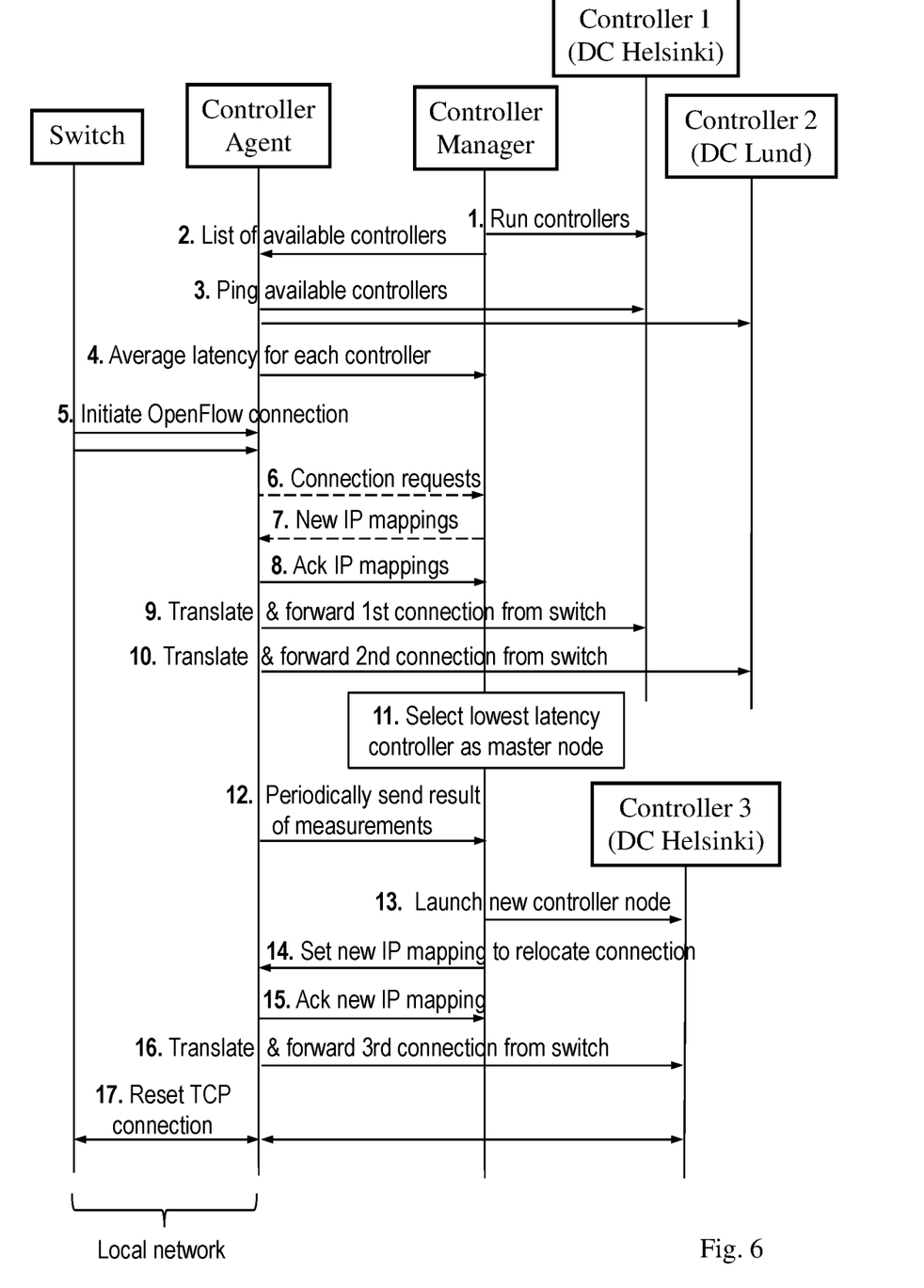
FIG. 6 is a signaling diagram illustrating another example of a procedure when the solution is used, according to further possible embodiments.

FIG. 6 shows a simplified signaling diagram that illustrates an example of how the embodiments herein may be employed in practice, involving a controller manager, a local controller agent, a switch and a set of switch controllers 1-3, which entities correspond to the controller manager 106, the controller agent 108, the switch 102 and the switch controllers 104, 104A, respectively, as shown in FIGS. 1 and 2. In this example, the following steps 1-17 are executed:

1—The controller manager configures and runs new switch controller nodes in different data centers.

2—The manager sends a list of available switch controllers to the local controller agent to measure the latency. In this example, one switch controller denoted "Controller 1" resides in a Data Center, DC, located in Helsinki (Finland), while another switch controller denoted "Controller 2" resides in a DC located in Lund (Sweden).

3—Since there are no passive measurement results available, the controller agent starts active measurement by pinging all available switch controllers for IP addresses.

4—The controller agent sends a value of the average latency for each switch controller to the controller manager. The controller manager stores this result for further next steps.

5—The switch initiates multiple OpenFlow control connections. The switch can be configured to connect to several switch controllers. As mentioned above, this is mainly to achieve fault-tolerance in switches.

6—After receiving connection requests, the controller agent sends the request to the controller manager to request new IP mapping (for available controllers). However, this step is optional and the controller manager can set predefined IP addresses to the controller agent in advance, that is before receiving any connection request so then the agent could connect connections from the switch to available switch controllers.

7—The controller manager will then send a new IP mapping to the controller agent to forward the connections from the switch to the available controllers.

8—The controller agent reports and acknowledges the allocation of the IP mappings to the controller manager.

9—The controller agent translates and forwards the first connection from the switch to switch controller 1.

10—Similar to step 9, the controller agent translates and forwards another connection from the switch to switch controller 2.

11—The controller manager checks the latency results and selects the switch controller with lowest latency as the master controller. The controller manager can repeat this step e.g. after receiving more latency results and it may change the master controller. For example, if the processing latency of a master controller (based on the future passive measurements) is low, the controller manager will select a new switch controller as master node.

12—The controller agent continues the measurements and sends the result of passive measurement (processing delay) and active measurement (round-trip delay) to the controller manager.

13—The controller manager may decide to launch a new controller instance e.g. to cope with increased workload or in case of failure in switch controllers. It should be noted, if the controller manager launches new controller nodes in a new location, then it should repeat step 2 and asks the controller agent to perform the measurements.

14—The controller manager sends a new IP mapping to the controller agent. This mapping shows which connection from the switch should be forwarded to the new address.

15—The controller agent acknowledges and confirm the new IP mapping.

16—The controller agent translates and forwards the existing connection from the switch to a new switch controller 3. The controller agent already received information from the controller manager that which connection should be translated to a new IP address.

17—Since switch controller 3 does not have any information about the existing Transmission Control Protocol, TCP, connection, the switch will reset the TCP connection to the controller 3.

Some further examples 1-3 of how the above-described controller agent may be implemented will now be described.

Example 1 for Controller Agent

In the first example, the Controller Agent either integrates a NAT or controls (e.g. via the Port Control Protocol, PCP, or Universal Plug And Play, UPNP) a NAT. Instead of real controller addresses, switches may be configured with fixed pseudo addresses, i.e. IP addresses that do not correspond to any existing host but are routed outside the local network as they do not match any local network. The NAT sets up destination address translation based on the rules received from the Controller Manager. The translation tables in the NAT can then map each pseudo address to the currently configured IP address of the assigned controller.

Example 2 for Controller Agent

In the second example, the Controller Agent either integrates a Dynamic Host Configuration Protocol, DHCP, server or controls a DHCP server. The DHCP server receives the Discover message from the switch and identifies the MAC address of the switch. In the Offer message, the DHCP server replies (among the normal configuration information such as IP address and default gateway) with a Controller extension. The controller extension specifies the list of Controller addresses to which the switch should connect. The Controller Extension may be a new type of DHCP extension which could be useful in this context. The lease time should preferably be low to allow reconfiguration with a low delay; this causes the switch to renew its DHCP lease often with possibly new controller assignment. This particular example may require adaptation in the switch.

Example 3 for Controller Agent

In the third example, the Controller Agent either integrates a Open Flow switch or controls an Open Flow switch (e.g. via OpenFlow). The Controller Agent may in this case create rules that modify the destination addresses similarly to the NAT case in the above example 1.

Access Control

Each data center hosting Controllers could be protected by a physical or virtualized firewall. The Controller Manager may then perform access control toward switch controllers such as SDN controllers through this firewall. For example, access to Controllers running in an OpenStack based cloud could be controlled by defining rules in a Security Group. Each rule specifies which remote addresses and ports can access the Controller. OpenStack provides an API for remotely manipulating security groups. Rules could be defined so that the public address of the Controller Agent (or the public address of the NAT/switch controller by the Controller Agent, depending on used implementation) can access the Controller, with all other access denied as a default rule.

The Controller Manager and the switch Controllers may be implemented in resources of a cloud environment, often referred to as "the cloud". In that case, switch Controllers could be distributed between several locations (e.g. in different data centers) in order to reduce latency. The Controller Manager can instantiate new switch Controllers on demand. The embodiments herein may be used to implement a cloud service where switch Controllers are provided as an external service. The Controller Agent could preferably be located in the same site as the Switches.

In this disclosure, a solution is proposed which enables the controller to be employed as a service approach in SDN networks. The embodiments herein may introduce local controller agents which allow to find connections with low latency and connect local switches to remote switch controllers in an efficient manner. The local controller agent can continuously measure the processing latency in controller nodes and report the results to the centralized controller manager which then can optimize the selection and allocation of switch controllers. In addition, the controller agent enables third-party controller providers to control the connectivity of switches in a local network without having direct access to the local network.

While the solution has been described with reference to specific exemplifying embodiments, the description is generally only intended to illustrate the inventive concept and should not be taken as limiting the scope of the solution. For example, the terms "controller manager", "controller agent", "switch", "switch controller", "connectivity" and "connectivity rules" have been used in this disclosure, although any other corresponding entities, functions, and/or parameters could also be used having the features and characteristics described here.

ABBREVIATIONS

API Application Program Interface
DHCP Dynamic Host Configuration Protocol
DNS Domain Name System DoS Denial of Service
ICMP Internet Control Message Protocol
IP Internet Protocol
NAT Network Address Translation
PCP Port Control Protocol
REST Representational State Transfer
SDN Software Defined Networking
TCP Transmission Control Protocol
UPNP Universal Plug And Play

The invention claimed is:

1. A method performed by a controller manager for enabling a switch of a communication network to be controlled by a switch controller that performs logic switch operations, the method comprising:
   instructing a controller agent to perform measurements related to connectivity of the controller agent to each of a plurality of switch controllers among a set of switch controllers;
   obtaining, from the controller agent, the measurements performed by the controller agent related to connectivity of the controller agent to the set of switch controllers, wherein the controller agent is in the same communication network as the switch,
   selecting at least one switch controller in the set of switch controllers based on the obtained measurements, to control the switch, wherein the selected at least one switch controller is in another communication network that is different from the communication network of the controller agent and the switch, and
   instructing the controller agent to set up or route a connection between the switch and the selected at least one switch controller through which the controller agent forwards connection requests for the switch to the least one switch controller to responsively control switching by the switch based on the connection request.

2. The method according to claim 1, wherein said measurements related to connectivity are obtained by instructing the controller agent to perform the measurements.

3. The method according to claim 1, wherein the obtained measurements are related to at least one of: network latency, processing latency and throughput, and the at least one switch controller with lowest latency and/or highest throughput is selected.

4. The method according to claim 1, wherein the obtained measurements indicate connectivity to the switch controllers themselves or to one or more data centers where the switch controllers are located.

5. The method according to claim 1, wherein the communication network is a Software Defined Network, SDN.

6. A controller manager arranged to enable a switch of a communication network to be controlled by a switch controller that performs logic switch operations, wherein the controller manager comprises:
   at least one processor; and
   at least one memory storing instructions executed by the at least one processor to:
      instruct a controller agent to perform measurements related to connectivity of the controller agent to each of a plurality of switch controllers among a set of switch controllers;
      obtain from the controller agent, the measurements performed by the controller agent related to connectivity of the controller agent to the set of switch controllers, wherein the controller agent is in the same communication network as the switch,
      select at least one switch controller in the set of switch controllers based on the obtained measurements, to control the switch, wherein the selected at least one switch controller is in another communication network that is different from the communication network of the controller agent and the switch, and
      instruct the controller agent to set up or route a connection between the switch and the selected at least one switch controller through which the controller agent forwards connection requests for the switch to the at least one switch controller to responsively control switching by the switch based on the connection request.

7. The controller manager according to claim 6, wherein the at least one processor is configured by execution of the instructions to obtain said measurements related to connectivity by instructing the controller agent to perform the measurements.

8. The controller manager according to claim 6, wherein the obtained measurements are related to at least one of: network latency, processing latency and throughput, and the controller manager is configured to select the at least one switch controller with lowest latency and/or highest throughput.

9. The controller manager according to claim 6, wherein the obtained measurements indicate connectivity to the switch controllers themselves or to one or more data centers here the switch controllers are located.

10. The controller manager according to claim 6, wherein the at least one processor is configured by execution of the instructions to select the at least one switch controller is in response to receiving a connection request for the switch from the controller agent.

11. The controller manager according to claim 6, wherein the at least one processor is configured by execution of the instructions to control connection to the set of switch controllers by sending connectivity rules to the controller agent, said connectivity rules determining which switches should be connected to the respective switch controllers.

12. The controller manager according to claim 6, wherein the at least one processor is configured by execution of the instructions to instruct the controller agent to set up or route a connection between the switch and the selected at least one switch controller by sending an IP mapping of each switch controller to the controller agent.

13. A method performed by a controller agent for enabling a switch of a communication network to be controlled by a switch controller that performs logic switch operations, the method comprising:
   performing measurements related to connectivity of the controller agent to each of a plurality of switch controllers among a set of switch controllers, wherein the controller agent is in the same communication network as the switch,
   reporting said measurements related to connectivity to a controller manager,
   receiving from the controller manager an instruction to set up or route a connection between the switch and at least one switch controller which has or have been selected based on the reported measurements related to connectivity, wherein the selected at least one switch controller is in another communication network that is different from the communication network of the controller agent and the switch, and
   setting up or routing a connection between the switch and the at least one switch controller according to the received instruction and through which the controller agent forwards connection requests for the switch to the at least one switch controller to responsively control switching by the switch based on the connection request.

14. The method according to claim 13, wherein the measurements related to connectivity are performed by measuring at least one of: a round trip delay between each switch controller and the controller agent, a delay between a request and a following response from the respective switch controller, and the amount of traffic sent to/from the respective switch controllers.

15. The method according to claim 13, wherein the performed measurements indicate connectivity to the switch controllers themselves or to one or more data centers where the switch controllers are located.

16. The method according to claim 13, wherein said measurements of connectivity are performed in response to receiving a measurement instruction from the controller manager.

17. A controller agent arranged to enable a switch of a communication network to be controlled by a switch controller that performs logic switch operations, wherein the controller agent comprises:
at least one processor; and
at least one memory storing instructions executed by the at least one processor to:
perform measurements related to connectivity of the controller agent to each of a plurality of switch controllers among a set of switch controllers, wherein the controller agent is in the same communication network as the switch,
report said measurements related to connectivity to a controller manager,
receive from the controller manager an instruction to set up or route a connection between the switch and at least one switch controller which has or have been selected based on the reported measurements related to connectivity, wherein the selected at least one switch controller is in another communication network that is different from the communication network of the controller agent and the switch, and
setting up or routing a connection between the switch and the at least one switch controller according to the received instruction and through which the controller agent forwards connection requests for the switch to the at least one switch controller to responsively control switching by the switch based on the connection request.

18. The controller agent according to claim 17, wherein the at least one processor is configured by execution of the instructions to perform the measurements related to connectivity by measuring at least one of: a round trip delay between each switch controller and the controller agent, a delay between a request and a following response from the respective switch controller, and the amount of traffic sent to/from the respective switch controllers.

19. The controller agent according to claim 17, wherein the performed measurements indicate connectivity to the switch controllers themselves or to one or more data centers where the switch controllers are located.

20. The controller agent according to claim 17, wherein the at least one processor is configured by execution of the instructions to perform said measurements of connectivity in response to receiving a measurement instruction from the controller manager.

21. The controller agent according to claim 17, wherein the at least one processor is configured by execution of the instructions to receive connectivity rules, said rules determining which switches should be connected to the respective switch controllers.

* * * * *